United States Patent
Kuwamura (10) Patent No.: US 8,176,558 B2
(45) Date of Patent: May 8, 2012

(54) ANTI-VIRUS METHOD, COMPUTER, AND RECORDING MEDIUM

(75) Inventor: Shin'ya Kuwamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 379 days.

(21) Appl. No.: 12/494,946

(22) Filed: Jun. 30, 2009

(65) Prior Publication Data

US 2010/0043073 A1 Feb. 18, 2010

(30) Foreign Application Priority Data

Aug. 13, 2008 (JP) ................................. 2008-208568

(51) Int. Cl.
*G06F 11/00* (2006.01)
(52) U.S. Cl. ............... 726/24; 726/22; 726/23; 713/188
(58) Field of Classification Search ............... 726/22–24; 713/188
See application file for complete search history.

(56) References Cited

U.S. PATENT DOCUMENTS

| | | |
|---|---|---|
| 2002/0162015 A1 | 10/2002 | Tang |
| 2004/0255183 A1 | 12/2004 | Takahashi |
| 2006/0021029 A1 | 1/2006 | Brickell et al. |
| 2006/0136720 A1* | 6/2006 | Armstrong et al. ........... 713/164 |
| 2008/0263658 A1* | 10/2008 | Michael et al. .................. 726/22 |
| 2009/0158432 A1* | 6/2009 | Zheng et al. ..................... 726/24 |

FOREIGN PATENT DOCUMENTS

| | | |
|---|---|---|
| EP | 1 674 965 A2 | 6/2006 |
| JP | 2002-342106 | 11/2002 |
| JP | 2004-361994 | 12/2004 |
| JP | 2008-500653 | 1/2008 |
| WO | 2006/012197 | 2/2006 |

OTHER PUBLICATIONS

European Search Report dated Jul. 15, 2011 in corresponding European Patent Application 09164059.9.

* cited by examiner

*Primary Examiner* — Christopher Brown
(74) *Attorney, Agent, or Firm* — Staas & Halsey LLP (57) ABSTRACT

In one computer system, causing the second virtual machine, which executes antivirus software for detecting and removing the virus, to monitor at least one first virtual machine that is created on the computer and execute one or more application program, periodically storing a state of the first virtual machine as snapshot, suspending the first virtual machine from which the virus is detected if the antivirus software executed on the second virtual machine detects the virus, and restoring the first virtual machine at a state of a point in time when the snapshot is stored by using the snapshot of the suspended first virtual machine.

5 Claims, 8 Drawing Sheets

| VM NAME | STATE |
|---|---|
| FILTER SERVER | EXECUTION STATE |
| WEB SERVER | SUSPENSION STATE |

ANTI-VIRUS METHOD, COMPUTER, AND RECORDING MEDIUM

CROSS-REFERENCE TO RELATED APPLICATION

This application is based upon and claims the benefit of priority of the prior Japanese Patent Application No. 2008-208568, filed on Aug. 13, 2008, the entire contents of which are incorporated herein by reference.

FIELD

This embodiment relates to a technique for taking measures against the invasion of a virus into a computer.

BACKGROUND

In recent years, computers have become more infected with viruses that invade a computer and cause some damage. This is because a widely popularized communications network serves as an infection route of viruses. Therefore, antivirus measure is essential especially to computers that can transmit/receive data via a communications network.

The basic antivirus measure is to install antivirus software, which is software for removing viruses, in a computer. However, since it is difficult to take measures against new types of viruses, the infection of viruses cannot be completely prevented even if antivirus software is used. Virtual machines (VMs) are also used as another antivirus measure.

Virtual machines are one of virtualization techniques of computers. In virtual machines, different programs can be operated on virtualized hardware (resources). By using the virtual machines, a plurality of operating systems (OSes) can be operated on one computer. The programs on each virtual machine operate in independent address spaces, and do not directly interfere with one another. Accordingly, even if one virtual machine is infected with a virus, the other virtual machines are not infected with this virus. The virtual machines that are not infected with the virus can continue to operate. As a result, influences exerted by the infection of the virus can be more reduced by using the virtual machines.

Each virtual machine completely independently operates under a one-program execution environment. Therefore, antivirus software is conventionally prepared for each virtual machine when it is used.

Antivirus software generally detects viruses by referencing a definition file. The definition file stores pattern data of each virus. Accordingly, the definition file is also called a pattern file. Since a lot of viruses have been already found, the definition file has an enormous amount of data at present. This also leads to a significant increase in resources consumed by antivirus software, and a heavier load imposed on virtualized hardware, if the antivirus software is introduced into each virtual machine.

Both the increase in consumed resources and the heavier load imposed on hardware require higher specifications for the responsive operations of a computer. If a service is provided by the computer, the required higher specifications degrade the quality of the provided service.

Additionally, when the antivirus software is executed, the operations of the system sometimes become unstable. The definition file must be frequently updated to take measures against new types of viruses that appear one after another. Therefore, updating the definition file imposes a load on hardware, and a transmission/reception of data for an update via a communications network increases the amount of traffic. Also for these reasons, the responsive operations of the computer are hindered.

As a result, the viewpoint of causing a computer to operate more responsively is important as antivirus measures.

As referential technical documents, Japanese National Publication of International Patent Application No. 2008-500653, Japanese Laid-open Patent Publication No. 2004-361994, and Japanese Laid-open Patent Publication No. 2002-342106 can be cited.

SUMMARY

In a system according to an embodiment of the present invention, at least one first virtual machine that execute an application program, and a second virtual machine that executes antivirus software for detecting and removing a virus are created on a computer, the first and the second virtual machine are operated, and the second virtual machine is caused to monitor the first virtual machine.

By monitoring the operations of the first virtual machine, the second virtual machine is caused to detect the virus invading the first virtual machine, and to remove the detected virus. As a result, the need for executing antivirus software for each first virtual machine can be avoided.

The object and advantages of the invention will be realized and attained by means of the elements and combinations particularly pointed out in the claims. It is to be understood that both the forgoing general description and the following detailed description are exemplary and explanatory and are not restrictive of the invention, as claimed.

DESCRIPTION OF EMBODIMENTS

Embodiments according to the present invention are described in detail below with reference to the drawings.

Figure 1:
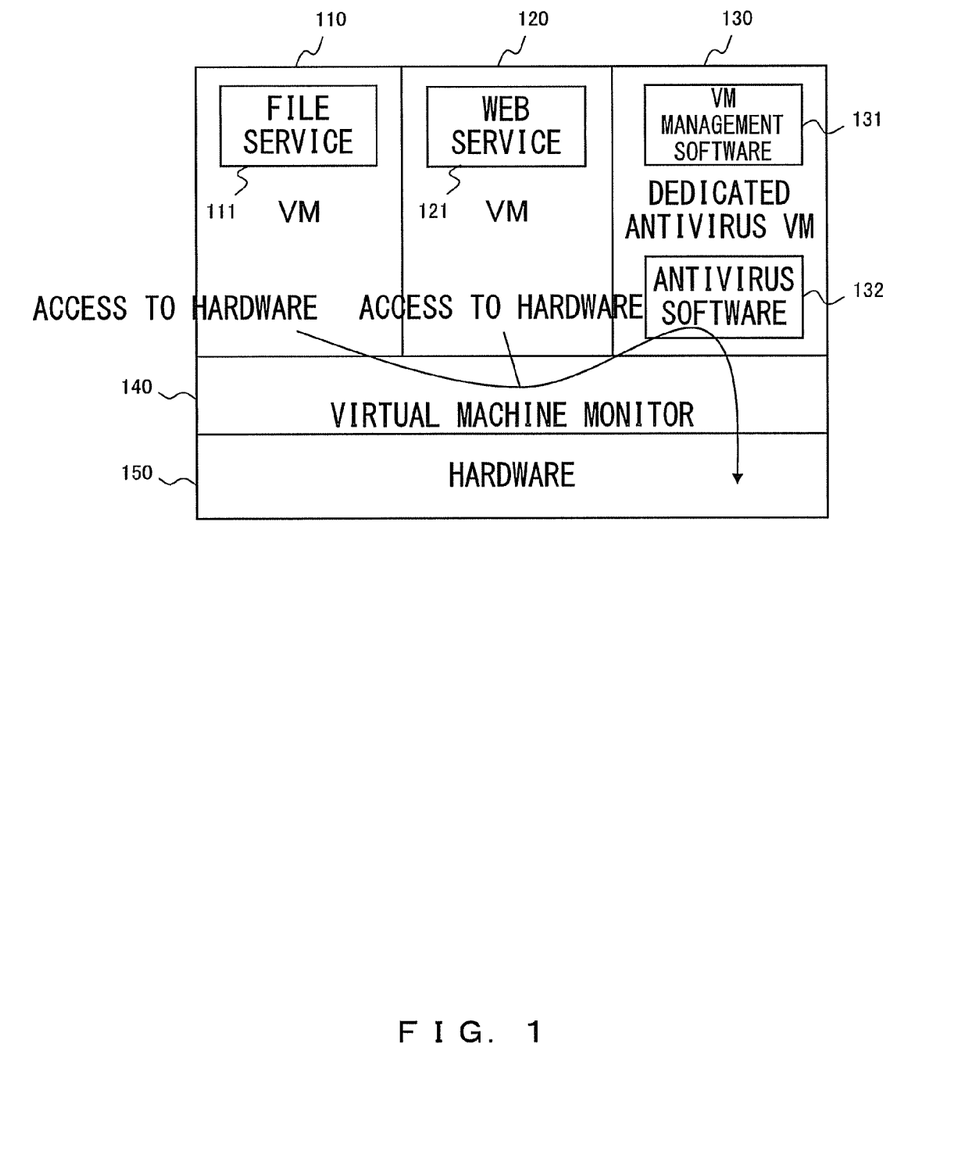
FIG. 1 illustrates a system configuration of a computer according to an embodiment.

FIG. 1 illustrates a system configuration of a computer according to an embodiment. The system configuration illustrated in FIG. 1 represents an environment where the computer is operating. This embodiment corresponds to a computer that is used as a server for providing a service to a user of a terminal device connected via a communications network such as the Internet, etc. The computer is also referred to as a server hereinafter.

In this embodiment, a plurality of virtual machines are created on the server, and an application program (hereinafter abbreviated to an application) to be executed by the server is operated on any of the virtual machines. 110, 120 and 130 in FIG. 1 represent the virtual machines created on the server. On the virtual machine 110, an application 111 that shares a file managed by the server itself with another terminal device on a communications network and provides an externally available file service is operating. On the virtual machine 120, an application 121 that implements a data transmission using WWW (World Wide Web) is operating. On the virtual machine 130, VM management software (hereinafter abbreviated to management software) 131 for managing the other virtual machines, the virtual machines 110 and 120 in this case, and antivirus software for detecting and removing a virus are operating. On the virtual machines 110 and 120, else one or more application is usually operating. That is, the virtual machines 110 and 120 execute one or more application usually.

A virtual machine monitor (hypervisor) 140 creates a virtual machine, and dynamically and transparently allocates hardware 150 to the virtual machine. As a result, the plurality of virtual machines 110, 120 and 130 can simultaneously operate on one physical server. On each of the virtual machines 110, 120 and 130, an OS (Operating System) is executed. An OS operating on a virtual machine is called a guest OS. The hardware 150 corresponds to the resources of the server.

The virtual machine 110 causes the server to function as a file server by operating the application 111 corresponding to the file service. Therefore, the virtual machine assigned with 110 is also referred to as a file server hereinafter. The virtual machine assigned with 120 causes the server to function as a WEB server by operating the application 121 corresponding to the Web service. Therefore, this machine is also referred to as a Web server hereinafter. On the virtual machine assigned with 130, the VM management software 131 is operating. Therefore, this machine is also referred to as a dedicated antivirus virtual machine hereinafter.

An arrow illustrated in FIG. 1 represents a route used when the file server 110 and the Web server 120 respectively access the hardware 150. Namely, the file server 110 accesses the hardware 150 on the route of the file server 110 to the virtual machine monitor 140 to the dedicated antivirus virtual machine 130 to the virtual machine monitor 140 to the hardware 150. Similarly, the Web server 120 accesses the hardware 150 on the route of the Web server 120 to the virtual machine monitor 140 to the dedicated antivirus virtual machine 130 to the virtual machine monitor 140 to the hardware 150.

In this embodiment, virus detection by the dedicated antivirus virtual machine 130, and the removal of a virus detected by the dedicated antivirus virtual machine 130 can be made by using the above described access route. In other words, using the above described access route avoids the need for operating the antivirus software 132 on the other virtual machines 110 and 120. The operations of the virtual machines 110 and 120 that do not operate the antivirus software 132 are prevented from becoming unstable by operating the antivirus software 132. Moreover, the consumption of the resources of the virtual machines 110 and 120 by the antivirus software 132 can be avoided. As a result, in the system illustrated in FIG. 1, the resources of the entire server are less consumed and its load is less imposed than in the case where the antivirus software 132 is operated on each virtual machine. As a result, high security and an environment where the server operates more responsively and stably can be implemented.

Viruses sometimes attack the antivirus software 132. However, the dedicated antivirus virtual machine 130 that operates the antivirus software 132 is created as a virtual machine dedicated to measures against a virus that invades the other virtual machines 110 and 120. Accordingly, there is no virus infection route on the virtual machine 130. The virtual machines are completely independent. Therefore, even if the other virtual machines are infected with a virus, the risk that the antivirus software 132 on the virtual machine 130 is attacked by the virus can be avoided. Accordingly, the state where the antivirus software 132 can monitor the server can be maintained. Also for this reason, high security is implemented.

Figure 7:
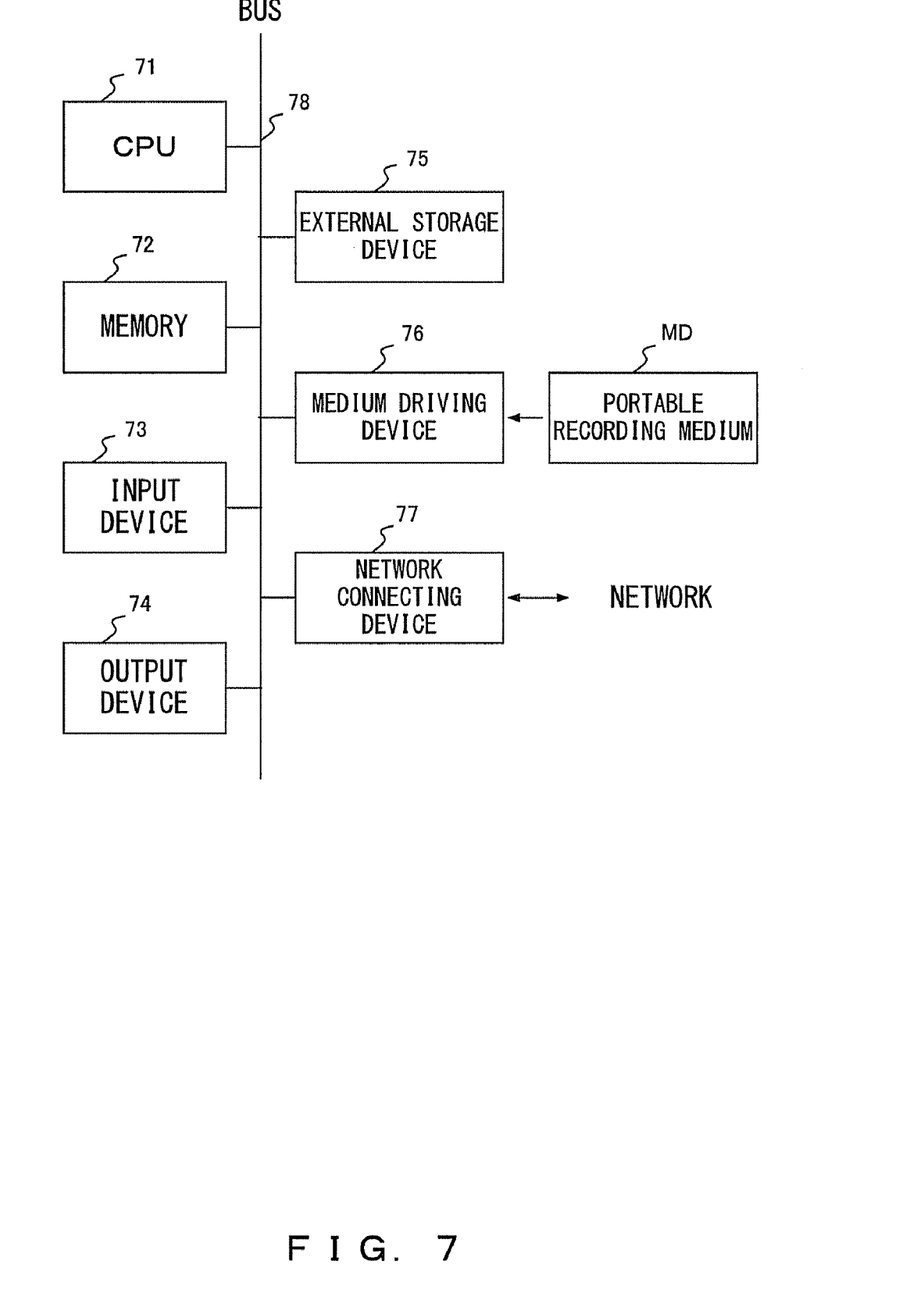
FIG. 7 illustrates an example of a hardware configuration of a computer to which the present invention is applicable.

FIG. 7 illustrates an example of a hardware configuration of the computer to which the embodiment according to the present invention is applicable.

The computer illustrated in FIG. 7 includes a CPU 71, a memory 72, an input device 73, an output device 74, an external storage device 75, a medium driving device 76, and a network connecting device 77, which are interconnected by a bus 78. The configuration illustrated in FIG. 7 is merely one example, and the configuration of the computer is not limited to this one.

The CPU 71 controls the entire computer.

The memory 72 is a memory such as a RAM, etc. for temporarily storing a program or data stored in the external storage device 75 or a portable recording medium MD at the time of execution of the program, an update of the data, or the like. The CPU 71 controls the entire computer by loading the program into the memory 72 to execute the program.

The input device 73 is an interface connected to an operating device such as a keyboard, a mouse, etc. The input device 73 detects an operation of a user performed with the operating device, and notifies the CPU 71 of the detection result.

The output device 74 is, for example, a display control device connected to a display device. The network connecting device 77 is intended to make a communication with an external device via a communications network such as an intranet, the Internet, etc. The external storage device 75 is, for example, a hard disk device. The external storage device 75 is mainly used to store various types of data and programs.

The medium driving device 76 is intended to access the computer readable recording medium, portable recording medium MD in other words, such as an optical disk, a magneto-optical disk, etc. The types of the medium are not limited to these ones.

The components 71 to 77 illustrated in FIG. 7 correspond to the hardware 150 illustrated in FIG. 1. Programs respectively executed by the virtual machine monitor 140 and the virtual machines 110, 120 and 130 are stored, for example, in the external storage device 75. The system configuration illustrated in FIG. 1 is implemented in a way such that the CPU 71 invokes the virtual machine monitor 140 after loading it into the memory 72, and executes the programs for the virtual machines 110, 120 and 130 after loading them into the memory 72 according to the control of the virtual machine monitor 140. Various types of programs including the virtual machine monitor 140 may be distributed by being recorded on the recording medium MD, or may be obtained by the network connecting device 77.

Operations of the server are described in detail below with reference to the flowcharts of FIGS. 2 to 4, and the explanatory views of FIGS. 5 and 6.

Figure 2:
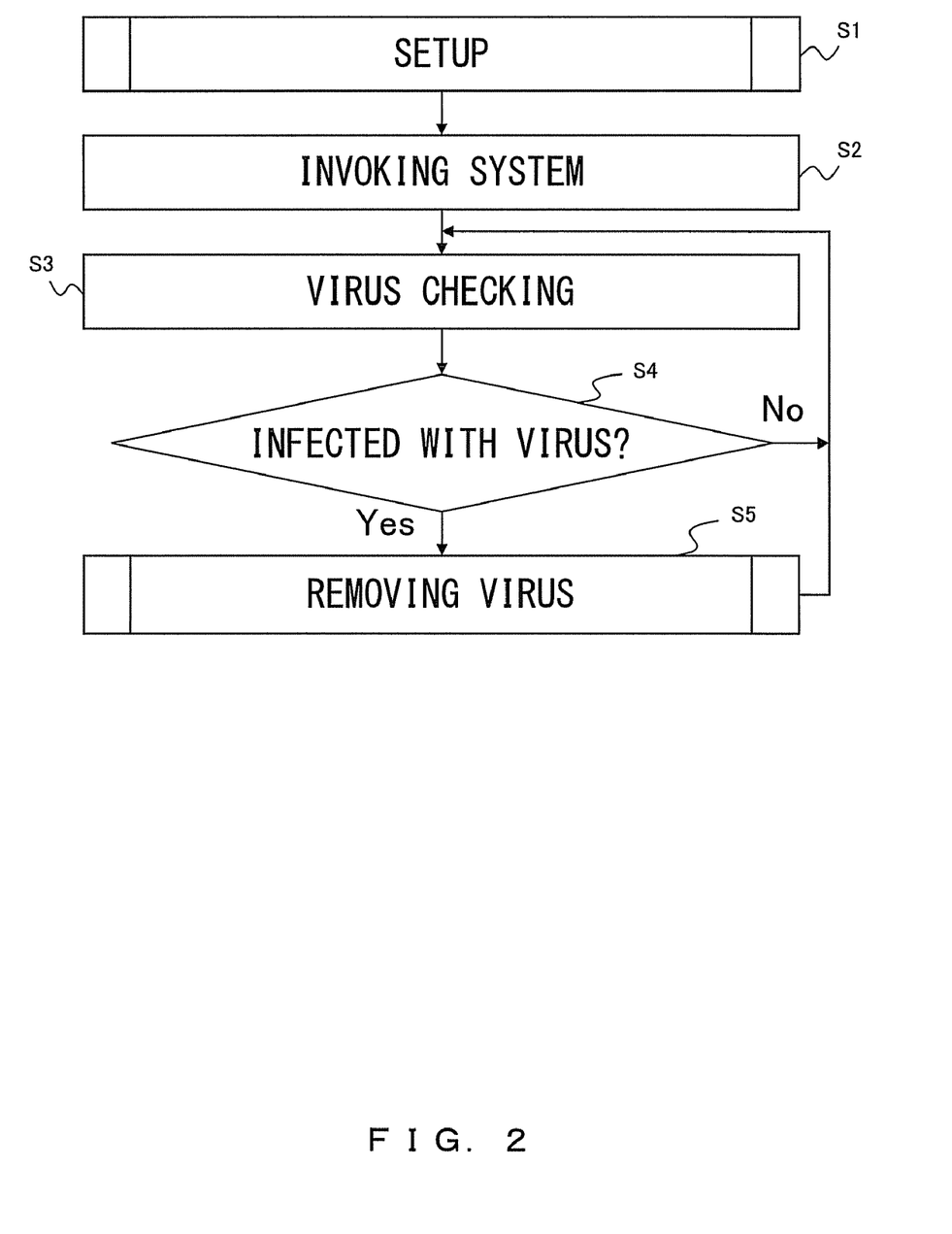
FIG. 2 illustrates a flow of a process.

FIG. 2 illustrates the flowchart of the process of the entire server according to this embodiment. The process illustrated in FIG. 2 is represented by focusing the virtual machine monitor 140, and the dedicated antivirus virtual machine 130.

Initially, in step S1, a setup process for creating a virtual machine is executed. This setup process is a process executed by the virtual machine monitor 140. The creation of a virtual machine is automatically made according to predefined contents.

Figure 3:
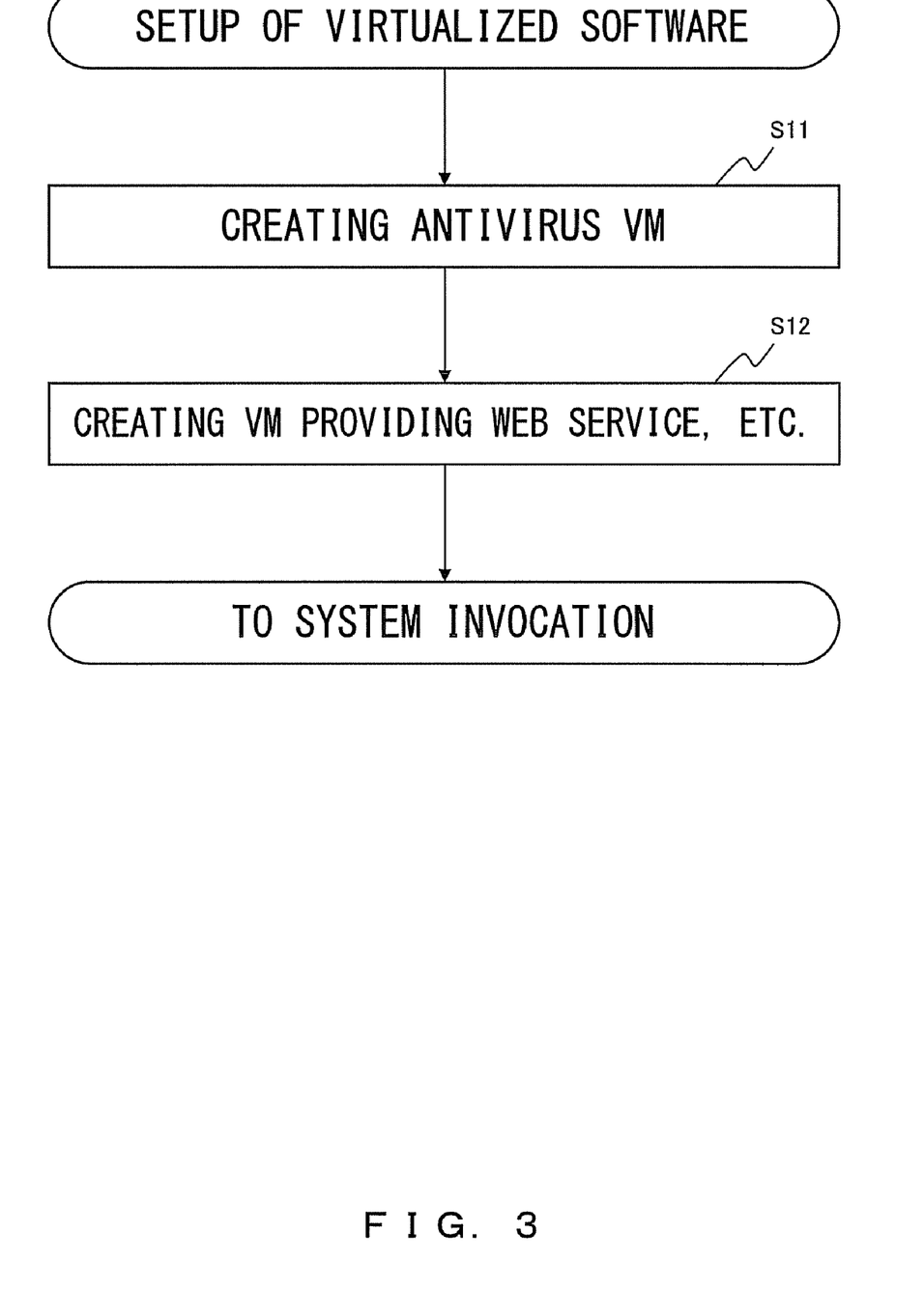
FIG. 3 is a flowchart illustrating a setup process.

FIG. 3 is a flowchart illustrating the setup process in step S1. The setup process is described in detail with reference to FIG. 3.

Initially, in step S11, the virtual machine monitor 140 creates the dedicated antivirus virtual machine 130. Then, in step S12, the virtual machine monitor 140 creates the other virtual machines, namely, the virtual machine 110 for providing the file service, and the virtual machine 120 for providing the Web service in the system configuration illustrated in FIG. 1. After creating all the virtual machines to be created in this way, the setup process of FIG. 3 is terminated.

Referring back to the description of FIG. 2.

In step S2 subsequent to the termination of the above described setup process, the virtual machine monitor 140 invokes the created virtual machines. After invoking the virtual machines, the process goes to step S3. step S3 and subsequent ones represent the process executed by the dedicated antivirus virtual machine 130. The process in and after step S3 represents the process by focusing the management software 131 that is operating on the virtual machine 130.

In step S3, the antivirus software 132 is caused to make virus checking for the virtual machines, which is instructed from the virtual machine monitor 140. In step S4, results of the virus checking are received from the antivirus software 132, and whether or not each of the virtual machines is infected with a virus is determined. If the antivirus software 132 detects a virus as a result of the virus checking, the determination of step S4 results in "YES". Then, the process goes to step S5, in which a virus removal process is executed for the detected virus. Then, the process goes back to step S3, in which the process gets ready for the next virus checking. In this way, measures can be always taken against viruses. In the meantime, if the antivirus software 132 does not detect a virus, the determination of step S4 results in "NO". Then, the process goes back to step S3.

As described above, the dedicated antivirus virtual machine 130 executes the virus checking for the other virtual machines, and the process for taking measures against a detected virus when necessary. As a result, high security can be implemented without introducing the antivirus software 132 into the other virtual machines.

Figure 4:
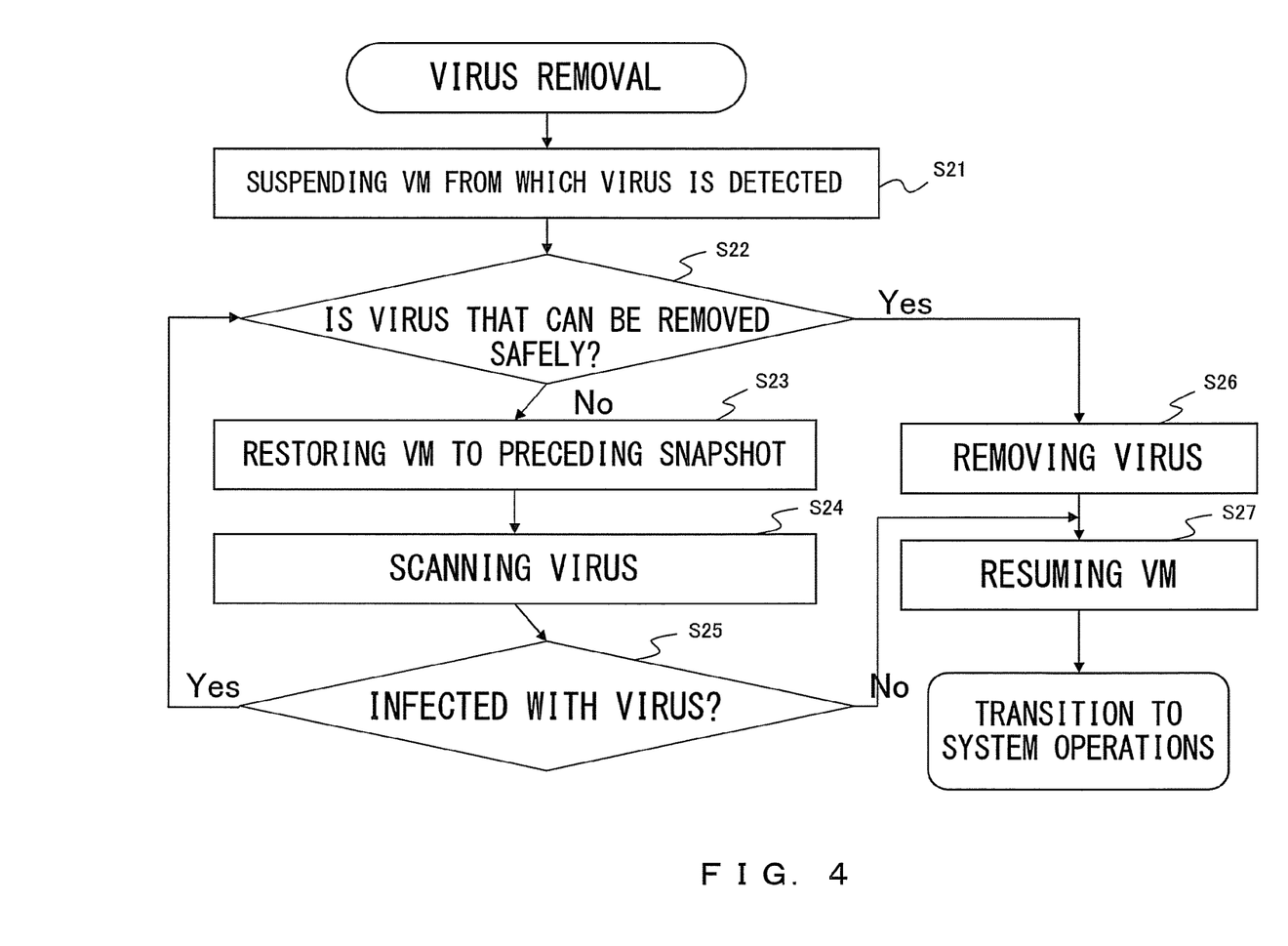
FIG. 4 is a flowchart illustrating a virus removal process.

FIG. 4 is a flowchart illustrating the virus removal process executed as step S5. The virus removal process is described in detail with reference to FIG. 4. This virus removal process is executed by the VM management software 131.

Initially, in step S21, a virtual machine from which a virus is detected is suspended via the virtual machine monitor 140. Then, in step S22, whether or not the virus detected by the antivirus software 132 can be completely removed is determined. If it is notified from the antivirus software 132 that the virus can be completely removed, the determination of step S22 results in "YES". Then, the process goes to step S26. Otherwise, the determination of step S22 results in "NO", and the process goes to step S23.

In step S26, the antivirus software 132 is caused to remove the virus. Next, in step S27, the operations of the virtual machine from which the virus is detected are resumed via the virtual machine monitor 140. Thereafter, the virus removal process is terminated.

In this embodiment, the virtual machines 110 and 120 periodically store their states as snapshots. In step S23 executed after the determination of step S22 results in "NO", the state of the virtual machine from which the virus is detected is restored to the state when a snapshot representing the preceding state is stored by using the snapshot. Then, in step S24, the antivirus software 132 is caused to scan the virtual machine restored with the process in step S23.

In step S25 subsequent to step S24, scanning results are received from the antivirus software 132, and whether or not the virtual machine restored to the preceding snapshot is infected with a virus is determined. If the virtual machine had been already infected with the virus when the snapshot used for restoration was stored, the determination of step S25 results in "YES". Then, the process goes back to step S22, in which whether or not the infected virus can be removed is determined. If the virtual machine restored to the preceding snapshot is not infected with the virus, the determination of step S25 results in "NO". Then, the process goes to step S27, in which the restored virtual machine is resumed.

As described above, in this embodiment, virus checking for a virtual machine after being restored with the latest snapshot is initially made. If a virus detected by the virus checking cannot be removed, the virtual machine is again restored by using the preceding snapshot. If a virus that cannot be removed is detected in the virtual machine again restored, the virtual machine is further restored by using the snapshot stored before the preceding one. This is because the definition file that the antivirus software 132 uses to detect viruses is frequently updated, and a virus that cannot be detected with the past definition file can be detected by the updated definition file in some cases. Accordingly, the virus removal can be more effectively made in this embodiment.

There may be cases where all of stored snapshots are infected with viruses. Accordingly, whether or not there is no more snapshot to be used for restoration, or whether or not a virtual machine is restored by a predetermined number of times can be made in step S25 although this is not particularly illustrated. As a result, if there is no more snapshot to be used for restoration, or if a virtual machine is restored by a predetermined number of times, the virus removal process is terminated without resuming the virtual machine from which the virus is detected.

Figure 5:
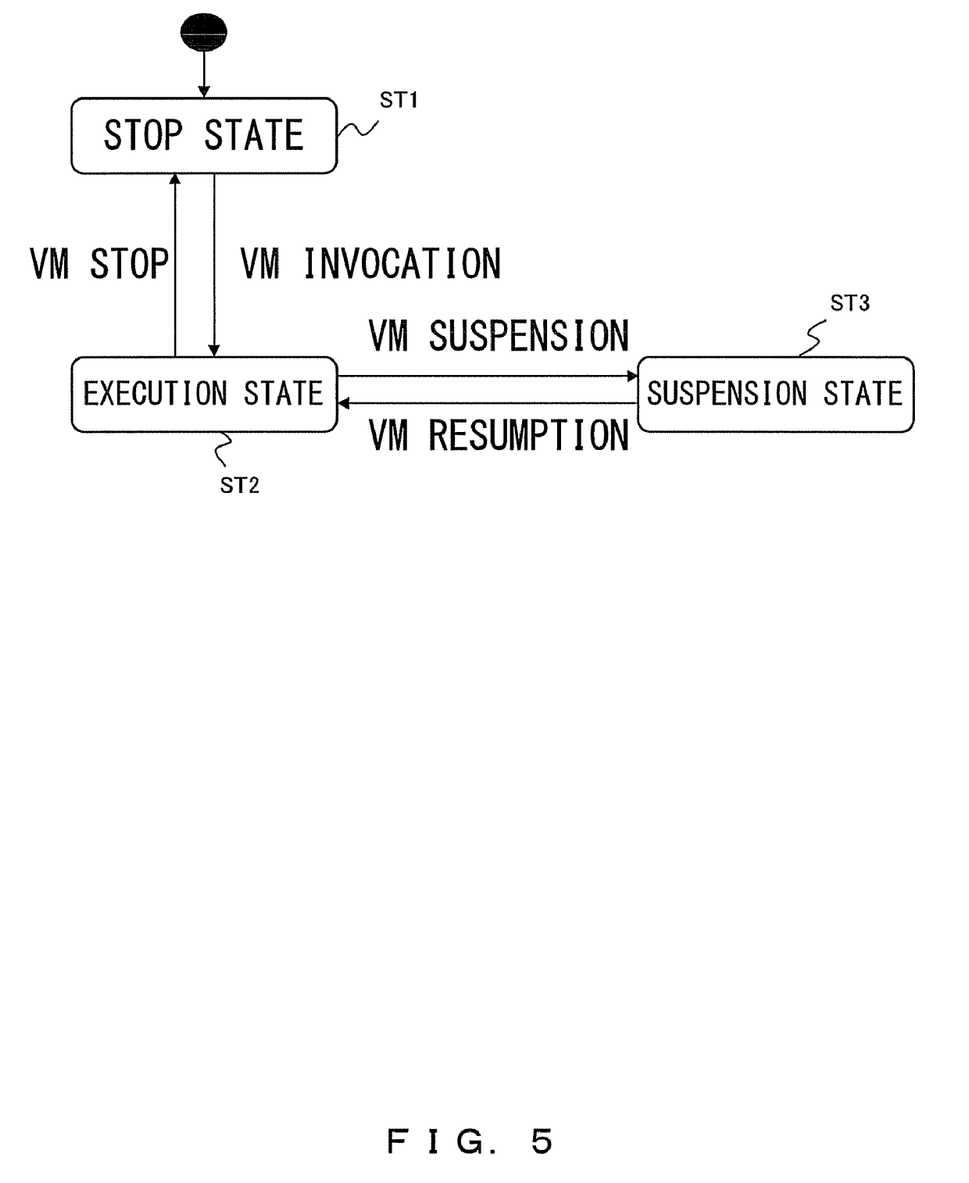
FIG. 5 is an explanatory view of state transitions of a virtual machine.

FIG. 5 is an explanatory view of state transitions of a virtual machine. In FIG. 5, an arrow starting at a black circle represents the initial state. Namely, FIG. 5 represents that a stop state ST1 is the initial state.

As illustrated in FIG. 5, the virtual machine makes a transition from the stop state ST1 that is the initial state to an execution state ST2 by being invoked, and further makes a transition from the execution state ST2 to a suspension state ST3 by being suspended. The virtual machine makes a transition from the suspension state ST3 to the execution state ST2 by being resumed, and further makes a transition from the execution state ST2 to the stop state ST1 by being stopped. The management software 131 manages the transitions other than the transition from the stop state ST1 to the execution state ST2 by executing the above described virus removal process.

Figure 6:
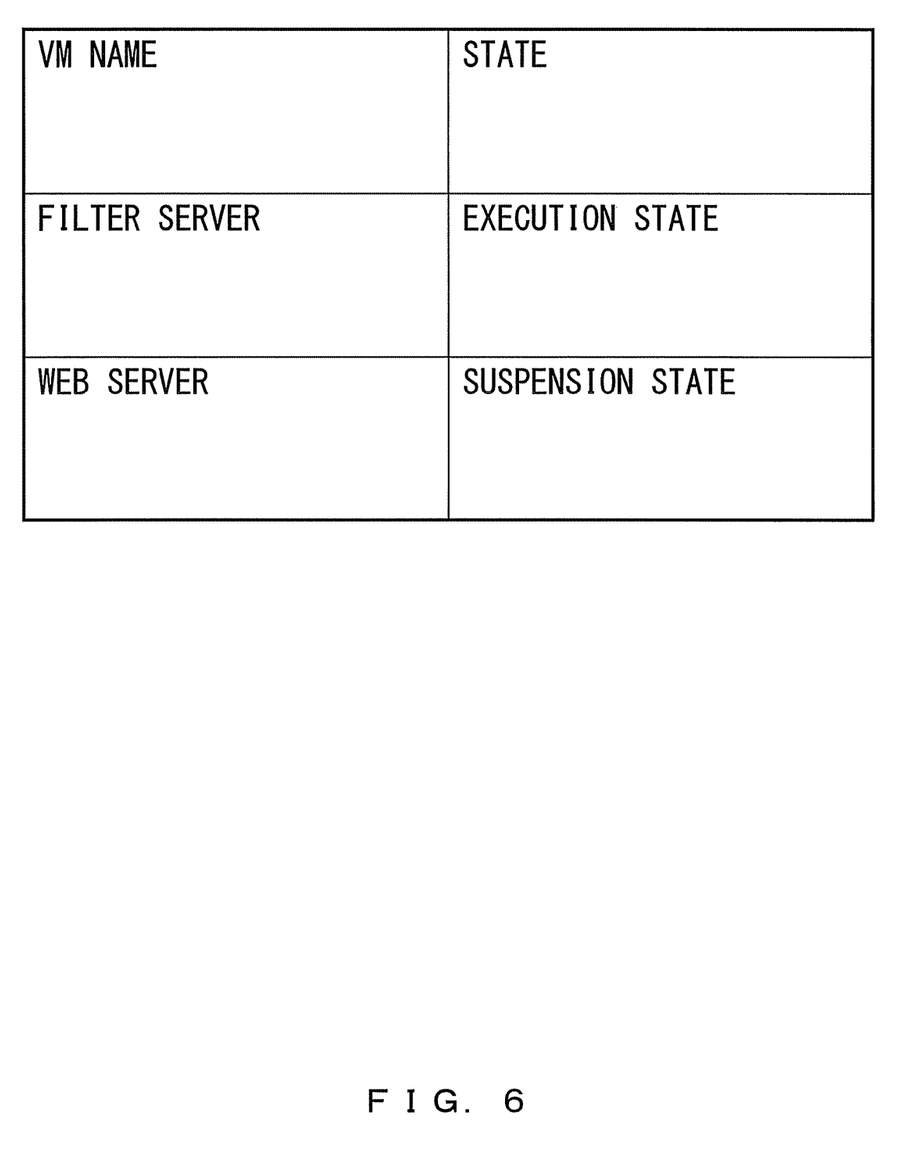
FIG. 6 is an explanatory view of a configuration of a management table for managing virtual machines.

To manage such state transitions, the management software 131 uses a management table configured as illustrated in FIG. 6. In the management table illustrated in FIG. 6, "VM name" that is a name for uniquely identifying a virtual machine is set for each virtual machine. Moreover, data "state" that represents the current state is stored for each virtual machine. The management table of FIG. 6 represents that, for example, "file server" is in "execution state", and "Web server" is in "suspension state". The management software 131 refers the management table, verifies the current state of a virtual machine, and decides the state to which the virtual machine is to make a transition. This management table is stored in address space allocated to the dedicated antivirus virtual machine 130. Hardware corresponding to the address space allocated to the dedicated antivirus virtual machine 130 is, for example, the external storage device 75.

This embodiment is implemented by applying the present invention to one physical server. However, the present invention is also applicable to a computer system built by using two or more physical computers. Namely, the present invention is widely applicable to computers. Its ways of applications are not limited to this embodiment as a matter of course.

Figure 8:
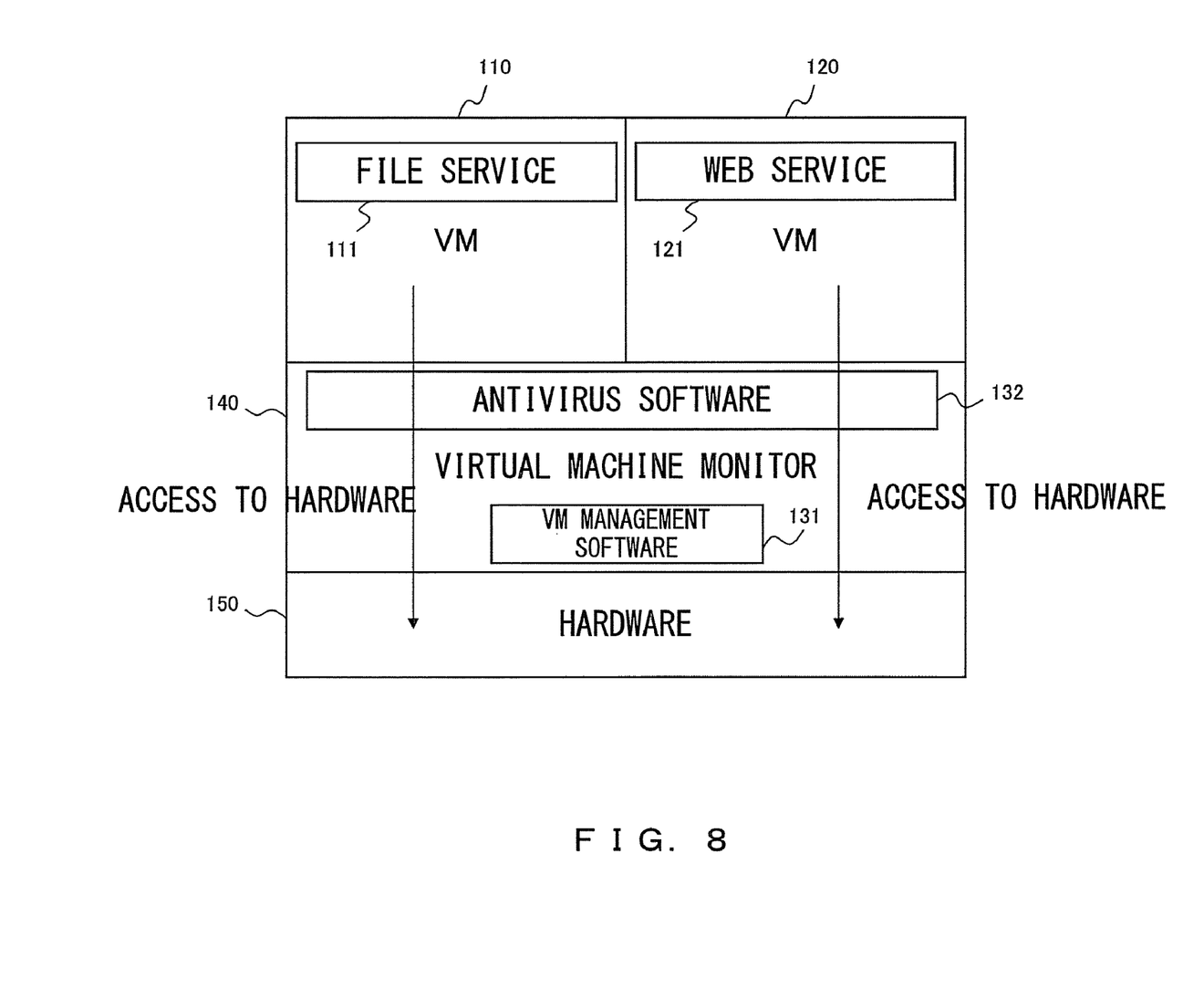
FIG. 8 illustrates a system configuration of a computer according to another embodiment.

Additionally, this embodiment is implemented by operating the antivirus software 132 on the dedicated virtual machine 130. However, the antivirus software 132 can be operated on the virtual machine monitor 140. FIG. 8 illustrates a system configuration of the computer when the antivirus software 132 is operated on the virtual machine monitor 140. As illustrated in FIG. 8, the antivirus software 132 is operated on the virtual machine monitor 140 along with the VM management software 131. Therefore, the virtual machine 130 is not created, and only the virtual machines 110 and 120 are created. Accesses to the hardware 150 of the virtual machines 110 and 120 are made only via the virtual machine monitor 140.

As described above, at least one first virtual machine that execute an application program, and a second virtual machine that executes antivirus software for detecting and removing a virus are created on a computer, the first and the second virtual machine are operated, and the second virtual machine is caused to monitor the first virtual machine.

By monitoring the first virtual machine, the second virtual machine is caused to detect a virus that invades the first virtual machine, and to remove the detected virus. In this way, the need for executing antivirus software for each first virtual machine is avoided. By avoiding this need, resources consumed by the antivirus software, and an imposed load can be reduced on the entire computer. As a result, an environment where the computer operates more responsively, and high security (more effective antivirus measures) can be implemented.

Each virtual machine operates under a one-program execution environment. The antivirus software may be operated under a program execution environment different from virtual machines. For example, the antivirus software may be operated on a virtual machine monitor (hypervisor) that manages virtual machines. Even if the antivirus software is operated under a program execution environment different from the virtual machine, an environment where the computer operates more responsively, and high security can be implemented.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

The invention claimed is:

1. An antivirus method for taking measures against a virus invading a computer, comprising:
   causing a second virtual machine, which executes antivirus software for detecting and removing the virus, to monitor at least one first virtual machine that is created on the computer and execute one or more application program;
   periodically storing a state of the first virtual machine as snapshot;
   suspending the first virtual machine from which the virus is detected if the antivirus software executed on the second virtual machine detects the virus;
   causing the antivirus software to detect the virus for the first virtual machine restored by using the snapshot;
   determining whether or not the antivirus software detects a virus that cannot be removed from the first virtual machine;
   restoring the first virtual machine at a state of a point in time when the snapshot representing a preceding state of the first virtual machine in the determining process is stored by using the preceding snapshot of the suspended first virtual machine, if the antivirus software detects the virus that cannot be removed from the first virtual machine;
   causing the antivirus software to scan the first virtual machine restored to the preceding snapshot;
   determining whether or not the first virtual machine restored to the preceding snapshot is infected with a virus based on scanning result;
   resuming the first virtual machine restored to the preceding snapshot if the restored first virtual machine is not infected with the virus; and
   returning to the process determining whether or not the antivirus software detects a virus that cannot be removed from the first virtual machine, if the restored first virtual machine is infected with the virus.

2. The antivirus method according to claim 1, wherein the suspending of the first virtual machine is made if the virus detected by the antivirus software cannot be removed.

3. An antivirus method for taking measures against a virus invading a computer, comprising:
   causing antivirus software for detecting and removing the virus to operate under a program execution environment different from virtual machine, and to monitor at least one virtual machine that is created on the computer and execute one or more application program;
   periodically storing a state of the virtual machine as snapshot;
   suspending the virtual machine from which the virus is detected, if the antivirus software detects the virus;
   causing the antivirus software to detect the virus for the virtual machine restored by using the snapshot;
   determining whether or not the antivirus software detects the virus that cannot be removed from the virtual machine;
   restoring the virtual machine at a state of a point in time when a snapshot representing a preceding state of the virtual machine in the determining process is stored by using the preceding snapshot of the suspended virtual machine, if the antivirus software detects a virus that cannot be removed from the virtual machine;
   causing the antivirus software to scan the virtual machine restored to the preceding snapshot;
   determining whether or not the virtual machine restored to the preceding snapshot is infected with a virus based on scanning result;
   resuming the virtual machine restored to the preceding snapshot if the restored virtual machine is not infected with the virus; and
   returning to the process determining whether or not the antivirus software detects a virus that cannot be removed from the virtual machine, if the restored virtual machine is infected with the virus.

4. A computer, comprising:
a creating unit capable of for creating at least one first virtual machine that execute one or more application program, and a second virtual machine that executes antivirus software for detecting and removing a virus invading the computer;
a storing unit capable of for periodically storing a state of the first virtual machine as snapshot;
a restoring unit capable of for suspending the first virtual machine, and for restoring the first virtual machine a state of a point in time when a snapshot is stored by using a snapshot of the first virtual machine;
a monitor controlling unit capable of for:
   operating the first virtual machine and the second virtual machine,
   causing the second virtual machine to monitor operation of the first virtual machine,
   causing the restoring unit to suspend the first virtual machine from which the virus is detected if the antivirus software executed on the second virtual machine detects the virus, and to restore the first virtual machine by using the snapshot stored by the storing unit,
   causing the antivirus software to detect the virus for the first virtual machine restored by using the snapshot,
   determining whether or not the antivirus software detects a virus that cannot be removed from the first virtual machine,
   causing the restoring unit to restore the first virtual machine at a state of a point in time when the snapshot representing a preceding state of the first virtual machine in the determining process is stored by using the preceding snapshot of the suspended first virtual machine, if the antivirus software detects the virus that cannot be removed from the first virtual machine,
   causing the antivirus software to scan the first virtual machine restored to the preceding snapshot,
   determining whether or not the first virtual machine restored to the preceding snapshot is infected with a virus based on scanning result,
   resuming the first virtual machine restored to the preceding snapshot if the restored first virtual machine is not infected with the virus, and
   returning to the process determining whether or not the antivirus software detects a virus that cannot be removed from the first virtual machine, if the restored first virtual machine is infected with the virus.

5. A non-transitory computer-readable recording medium on which is recorded a program for causing a computer to process of:
   suspending a virtual machine created on the computer, if the antivirus software detects a virus from the virtual machine;
   causing an antivirus software to detect the virus for the virtual machine restored by using a snapshot of the virtual machine;
   determining whether or not the antivirus software detects a virus that cannot be removed from the virtual machine;
   restoring the virtual machine at a state of a point in time when a snapshot representing a preceding state of the virtual machine in the determining process is stored by using the preceding snapshot of the suspended virtual machine, if the antivirus software detects the virus that cannot be removed from the virtual machine;
   causing the antivirus software to scan the virtual machine restored to the preceding snapshot;
   determining whether or not the virtual machine restored to the preceding snapshot is infected with a virus based on scanning result;
   resuming the virtual machine restored to the preceding snapshot if the restored virtual machine is not infected with the virus; and
   returning to the process determining whether or not the antivirus software detects a virus that cannot be removed from the virtual machine, if the restored virtual machine is infected with the virus.

* * * * *